United States Patent [19]

Damron

[11] Patent Number: 5,271,605

[45] Date of Patent: Dec. 21, 1993

[54] WIRE AND FIBER GUIDE FOR ELECTRICAL OUTLET BOXES

[76] Inventor: Herbert L. Damron, Box 3472, Pikeville, Ky. 41502

[21] Appl. No.: 957,792

[22] Filed: Oct. 8, 1992

[51] Int. Cl.$^5$ ............................................. E21C 29/16
[52] U.S. Cl. ......................................... 254/134.3 FT
[58] Field of Search ............... 254/134.3 FT, 134.3 R, 254/134.3 PA, 390, 415, 413; 220/3.2, 3.5; 226/179, 180, 194; 248/63, 231.1, 291

[56] References Cited

U.S. PATENT DOCUMENTS

| | | |
|---|---|---|
| 2,727,721 | 12/1955 | Pinkerton . |
| 2,746,715 | 5/1956 | Sherrod . |
| 2,746,716 | 5/1956 | Zachary . |
| 3,020,332 | 2/1962 | Appleton ..................... 254/134.3 R |
| 3,944,184 | 3/1976 | Fisch . |
| 4,033,551 | 7/1977 | Lindstrom . |
| 4,358,089 | 11/1982 | Metcalf ....................... 254/134.3 FT |
| 4,541,615 | 9/1985 | King ........................... 254/134.3 FT |
| 4,946,137 | 8/1990 | Adamczek ................. 254/134.3 FT |

*Primary Examiner*—Robert C. Watson

[57] ABSTRACT

A guide pulley 18 rotates freely and is affixed within a frame 16 which is dimensioned to fit within a standard electrical outlet positioned in the wall, floor, or ceiling. The frame 16 includes attachment tabs 26 which correspond to a standardized mounting. The frame 16 further includes a plurality of apertures 24 for relocating the pulley axle 20 so that the device may change configuration in order to adapt to different outlet box dimensions. The pulley 18 includes a spring-loaded axle mounting mechanism 20 whereby the pulley 18 and its axle 20 may be easily changed from one mounting position to another.

2 Claims, 5 Drawing Sheets

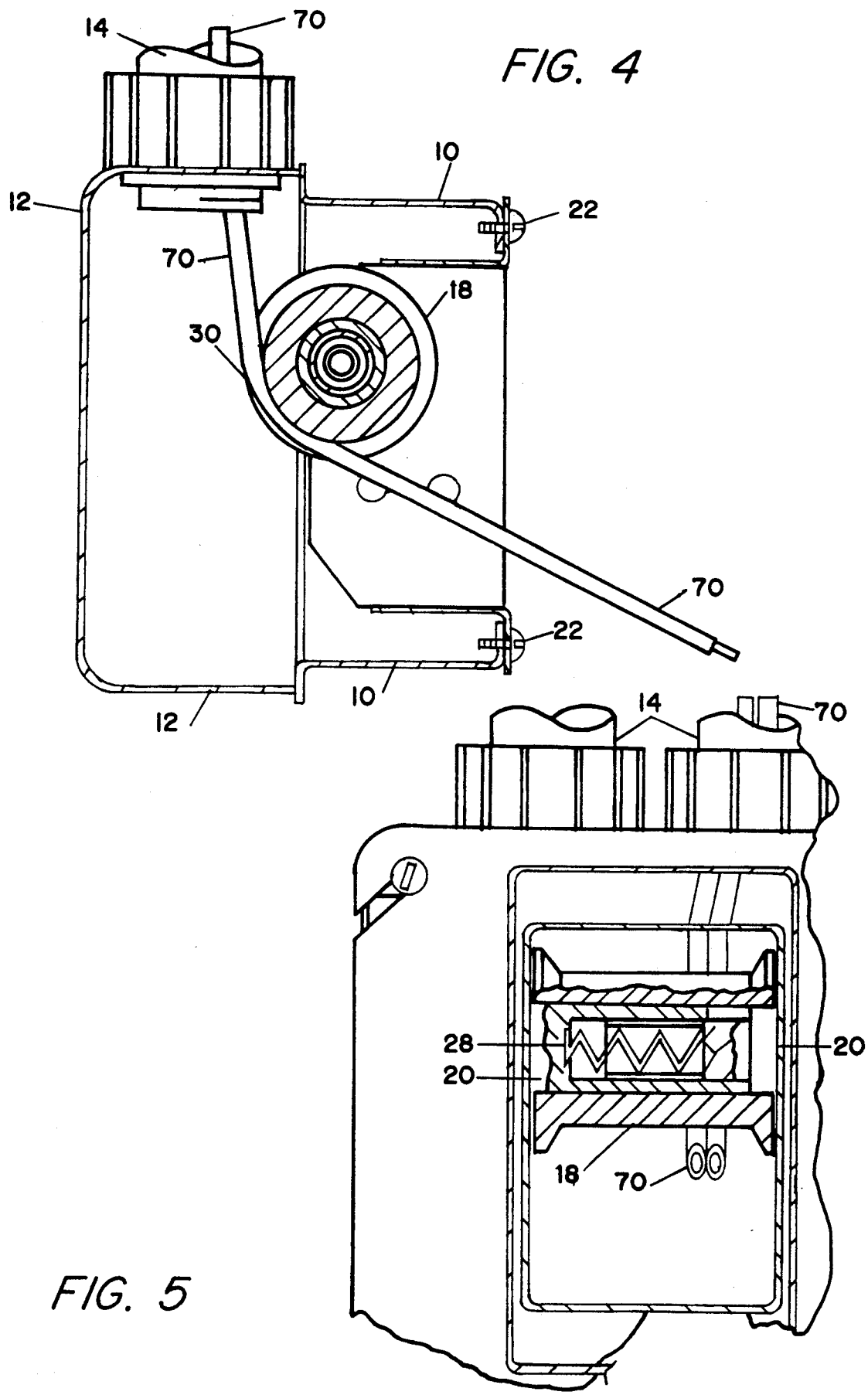

WIRE AND FIBER GUIDE FOR ELECTRICAL OUTLET BOXES

FIELD OF THE INVENTION

The present device relates to electrical power distribution in the building construction industry. More specifically, this invention relates to an improved means for guiding electrical wiring and fiber through the conduits and receptacles used in building structures.

DESCRIPTION OF THE PRIOR ART

Prior art devices being classified as wire guides have included many different types of mechanisms which have a variety of styles, but they serve only a narrow spectrum associated with the problems of pulling or feeding wire and fiber through conduit. Examples of prior art devices are disclosed in U.S. Pat. Nos. 4,541,615; 4,358,089; 3,944,184; 2,746,715; 2,746,716; 2,727,721, and 4,033,551. Heretofore, wire guiding mechanisms were designed for attaching various devices to a junction box or outlet box. However, the approaches used when fastening to the junction box must be done while both sides of the junction box are exposed, so that these different devices can be attached.

Some of these devices use various types of hooks which work by using the force of gravity to hold them in place. This fact would exempt them from being used in floor and ceiling boxes and outlet boxes placed on walls while being serviced into the top of them. One box termed an outlet box is a utility box commonly used where conduit is surface mounted. The reason this box is used for surface mounting is that it serves the need for surface mounting conduit by the shallow depth of the box and also by having knockouts where conduit can be attached near the rear of the box. This box is not designed for interior wall construction because the location of the knockouts is too close to the front of the box making interior wall construction very impractical and difficult. For example, in masonry it would require sawing or thin walling the units around the conduit.

Another device is designed to assist in pulling an electrical cable through an elbow without damage to the cable. Such prior art is to assist in pulling wire or cable through elbows or through other fixtures located in midline to exit and re-enter the conduit as one continuous-length item.

In most cases of prior art, the boxes which are located in the wall, floor, or ceiling are inaccessible after the construction is completed. Therefore a great deal of the wire and fiber pulling process is done after a floor, wall, or ceiling is installed, thus making the prior art devices limited in their ability to serve the electrical industry in a practical way.

In order to install or remove electrical wiring and fiber in commercial and industrial buildings, it is a well known practice to feed the items into tubular conduits which are connected to a junction box or outlet. Pulling the wires or fiber through the conduit fixtures is often a very difficult process because of friction between the wiring and the conduit. For example, since electrical outlet boxes are often located close to the floor, once the fish tape or small rope has been grasped, the technician pulls as near to a 180 degree extension to the conduit as possible to avoid the sharp bends in the fish tape or small rope within the electrical box which can cause kinking, friction or possible damage to the wire or fiber as they go through and exit the various types of receptacles. For such reasons his pulling strokes are usually short and strenuous. There is a need for a device which has more versatility which can serve the industry, whether it be for removing circuits in existing buildings for maintenance or for new construction.

Accordingly, several objects and advantages of my tool are: the simplicity of the design of this tool that is self-contained as a unit; it has within its design the ability to aid technicians in pulling wire or fiber in every situation where $\frac{1}{2}"$ or $\frac{3}{4}"$ conduit with receptacles is being used, and it provides technicians with the ability to extend the 180 degree course from the conduit to the said pulley. They are free to choose their working position. Since some circuits require as many as nine wires to be pulled through a $\frac{3}{4}$ inch conduit and possibly up to a hundred feet, the industry needs a device such as the present art which can withstand such pressure. The embodiment allows a pulley to be placed inside of a tile ring or plaster ring which allows the extension of the 180 degree course beyond the end of the conduit. The design of the present art will allow it to work in multi-gain boxes, weatherproof boxes, floor boxes, through wall boxes, and all tile and plaster rings regardless of their thickness.

The light weight of the present embodiment can be easily carried on a technician's belt. The basic design of the present art, once in place, assures the technician of smooth working manner for handling delicate materials such as optic fiber used in communications. The present art with its bias axle maintains constant and equal stability in all its positions.

Prior art devices are limited and unable to serve in a practical way because most are designed to attach to junction boxes and will not work if the wall, floor, or ceiling is in place around the said junction box. Prior art devices that work by gravity will not work in floor or ceiling boxes or outlet boxes placed on walls while being serviced into the top of them.

The present art will work in any situation that all prior art claims by attaching a 4 inch square device cover to the junction box or by attaching a single gain plaster ring or tile wall cover to the junction box. The present art will work after walls, floors, and ceilings are completed with conduit and after receptacles are placed within the structures. Therefore, the present art has a place in the industry to serve with such versatility and is able to withstand heavy work loads such as aiding technicians in pulling as many as nine wires through a $\frac{3}{4}$ inch conduit.

SUMMARY OF THE INVENTION

In order to meet the need described above, a simple guide pulley device has been devised. The guide pulley rotates freely and is affixed within a frame which is dimensioned to fit within a standard outlet box. The frame includes attachment tabs which correspond to standardized mounting tabs. The frame further includes apertures for locating the pulley axle so that the device may change configuration in order to adapt to different outlet box dimensions or wiring configurations. The pulley includes a spring-loaded, axle-mounting mechanism whereby the pulley and its axle may be easily changed from one mounting position to another.

These structures enable the present device to be accurately and securely positioned within a standard outlet box so that the guide pulley is properly positioned and secured. After a small length of wire, small rope, or the fish tape has been fished through the conduit and electrical box, the guide pulley, in its frame, is installed around the wire or leader. The wire may then be pulled straight forward in a line perpendicular to the wall or floor in which the outlet box is mounted. Hence, the wire may be pulled hand-over-hand quickly and easily. The pulley is also positioned at the optimum point whereby the wire has the least frictional contact with parts of the outlet box, including the mouth of the conduit where it meets the outlet box, which is one the most common place for friction with the electrical wiring to occur.

It is therefore an object of the present invention to devise a simple and inexpensive device to facilitate the installation of electrical wiring and optical fiber in buildings.

It is a further object of the present invention to reduce the friction and aid in the pulling of electrical wiring through conduits and outlet boxes by means of a guide pulley installed in the outlet box.

It is a further object of the present invention to provide an outlet box guide pulley for electrical wiring and also optical fiber that is used in communications which is inexpensive to manufacture and which can easily be adjusted to the dimensions of different outlet box configurations.

Other objects and advantages of the present device will be readily apparent from the foregoing drawings and description of the preferred embodiment.

BRIEF DESCRIPTION OF DRAWINGS

FIG. 4 is a side sectional view showing the location of the guide pulley once installed in the tile wall cover with the electrical wiring in position after being pulled through the conduit and tile wall cover.

FIG. 5 is a front sectional view taken from FIG. 4 showing details of the spring loaded axle construction of the guide pulley.

DRAWING REFERENCE NUMERALS

Figure 1:
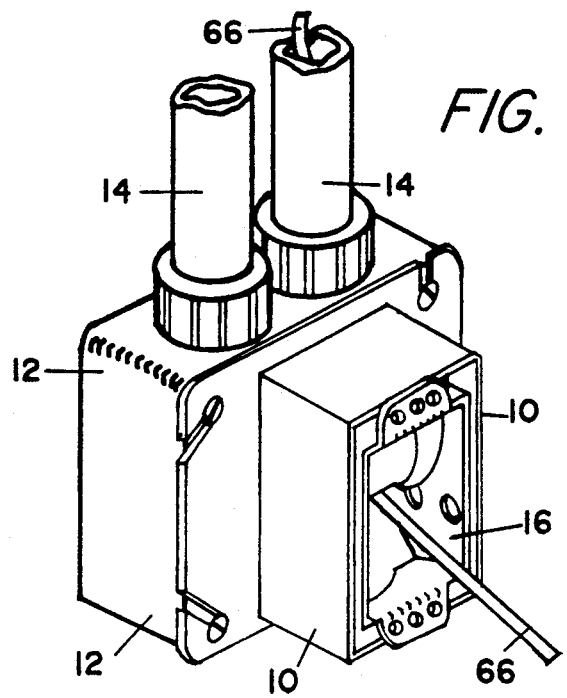
FIG. 1 in an isometric view showing the present device installed in a tile wall cover that is attached to a junction box.

10: tile wall covers
12: junction box
14: conduit
16: frame member
18: guide pulley
20: bias axles
22: screw of 16
24: apertures of 16
25: center hole of 26
26: tab portions of 16
27: outer hole of 26
28: spring of 20
30: contact point
32: 4×4 base
33: rectangular cutout of 16
34: cutout of 16
35: cut away of 16
36: notches of 10
38: flange of 10
40: holes of 38
42: raised portions of 10
44: screws for anchoring of 46
46: outer embodiment
48: plugs of 46
50: threaded holes of 46
52: inner embodiment of 46
54: partitions of 52
56: holes with proper spacing of 52
58: screws to raise inner embodiment of 46
60: mortar joint of 62
62: masonry units
64: holes for plates of 46
66: small rope
68: fish tape
70: wire
72: optic fiber

DESCRIPTION OF THE PREFERRED EMBODIMENT

Referring now to FIG. 1, the present art is shown installed in a tile wall cover 10 which is affixed to a junction box 12. Tubular conduit members 14, having enclosed a small rope 66 which travels through the conduit members 14 of that circuit. The present art includes frame member 16 which is dimensional to fit closely within the tile wall cover 10.

Figure 2:
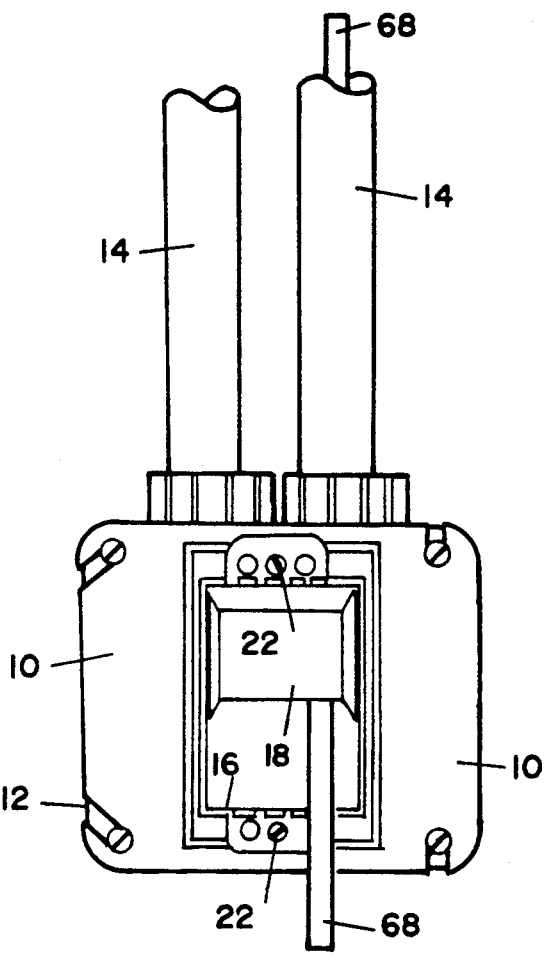
FIG. 2 is a front view of the present device as shown in FIG. 1 with the exception of illustrating the use of a fish tape.

Referring now to FIG. 2, the present art further includes a freely rotatable guide pulley 18 which guides the fish tape 68 out from the face of the tile wall cover 10. Screw 22 securely fastens the frame member 16 to the tile wall cover 10 that is affixed to junction box 12 that is connected to conduits 14.

Figure 3:
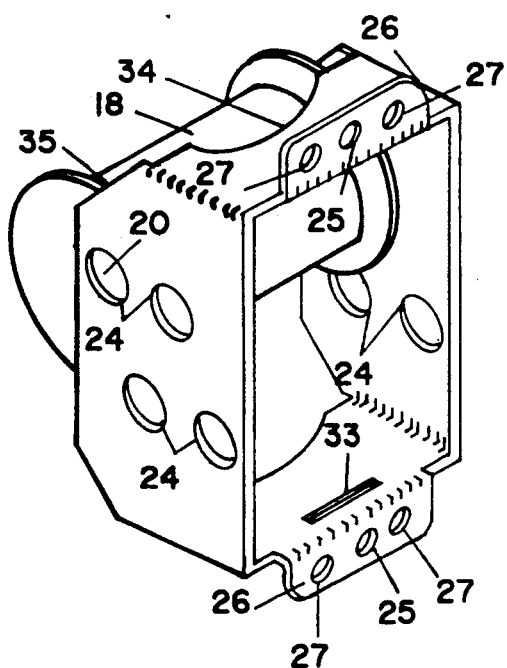
FIG. 3 is an isometric view of the present device removed from the tile wall cover.

Referring now to FIG. 3, greater detail of the present art is shown, which is a rectangular embodiment that will fit into a standard outlet box having tab portions 26, which includes center hole 25 which allows the attachment for singular gang and multi-gang excluding double gang. Outside hole 27 is for attachment to a double-gang receptacle. The rectangular embodiment has apertures 24 for positioning guide pulley 18 to the nearest position, allows the extension from the conduit 14 to guide pulley 18 nearest to 180 degrees, that can be seen in FIG. 4. Present art further has a cut-a-way 35 and cutout 34 which allows embodiment to move closer to the conduit 14 so as not to obstruct the 180 degree course of the wire, fiber, or fish tape while using smaller tile wall covers 10. Present art further has a rectangular cutout 33 to allow access behind flange 38 identified in FIG. 6 for optional fastening method.

Referring now to FIG. 4, the electrical wire 70 has been pulled through the conduit 14 and into junction box 12 and through the tile wall cover 10. The electrical wire makes a gentle bend around the guide pulley 18 at contact point 30. Screw 22 affix the present art rigidly to the tile wall cover 10. Guide pulley 18 is mounted on bias axle 20 which is being forced outward into apertures 24 by a spring 28, seen in FIG. 5.

Referring now to FIG. 5, details of the guide pulley 18 and axles 20 are shown. Spring means 28 bias axles 20 outwardly. The axles 20 are positioned on opposite sides of the guide pulley 18 and have a diameter which easily fits within the rectangular embodiment of the present art having apertures 24 (not shown in this figure, but shown in FIG. 3).

With the present art removed from the tile wall cover, the guide pulley 18 may be easily repositioned simply by depressing opposite sides of the spring loaded axles 20 and sliding the guide pulley 18 from one pair of axle retainer holes to another pair, seen in FIG. 4. The alternate retainer holes are placed at different positions within the rectangular embodiment so that the pulley 18 may be moved to different positions within the outlet box for proper alignment with the conduit 14.

Once installed, the electrical wiring 70 may now be pulled directly out from the front of the box. The guide pulley 18 directs the wiring smoothly out of the conduit and through the front of the outlet box. The force required to pull the wire through the conduit 14 is supported by the bias axles 20 that the guide pulley 18 rotates upon. The bend of the wire 70 may be kept to a minimum with wiring held in non-contacting relationship with the edge of the conduit or any other structures in the receptacles that may cause damage.

Figure 6:
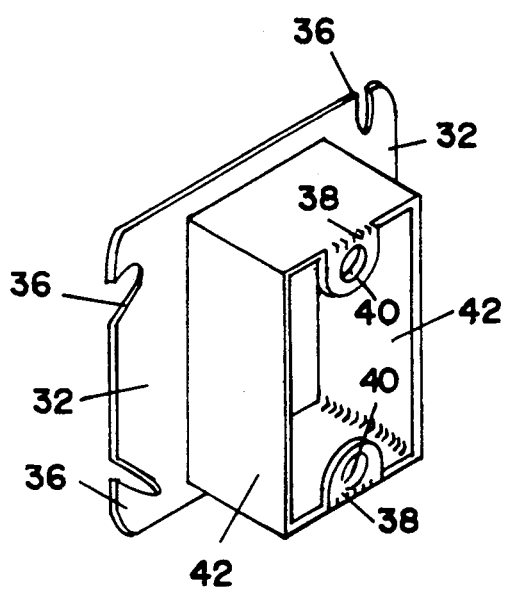
FIG. 6 is an isometric view of a tile wall cover.

Referring now to FIG. 6, this is an isometric view of a 4×4 cover (single gang). The 4×4 base 32 has notches 36 for quick mounting or removal to and from a junction box 12, seen in FIG. 1. The rectangular raised portion 42 may vary from 0 elevation to 2 inches away from the said base. The said present art described in FIG. 3, referring to said apertures 24, is located and positioned to serve the varying elevations of the 4×4 cover to extend the 180 degree course after the present art has been positioned inside the 4×4 cover letting the metallic or fiber material enter or exit with a smoother flow than the present systems used. Referring to raised portion 42, it has flanges 38 at opposite ends with holes 40 therein to receive screws 22 as described in FIGS. 2 and 4.

Figure 7:
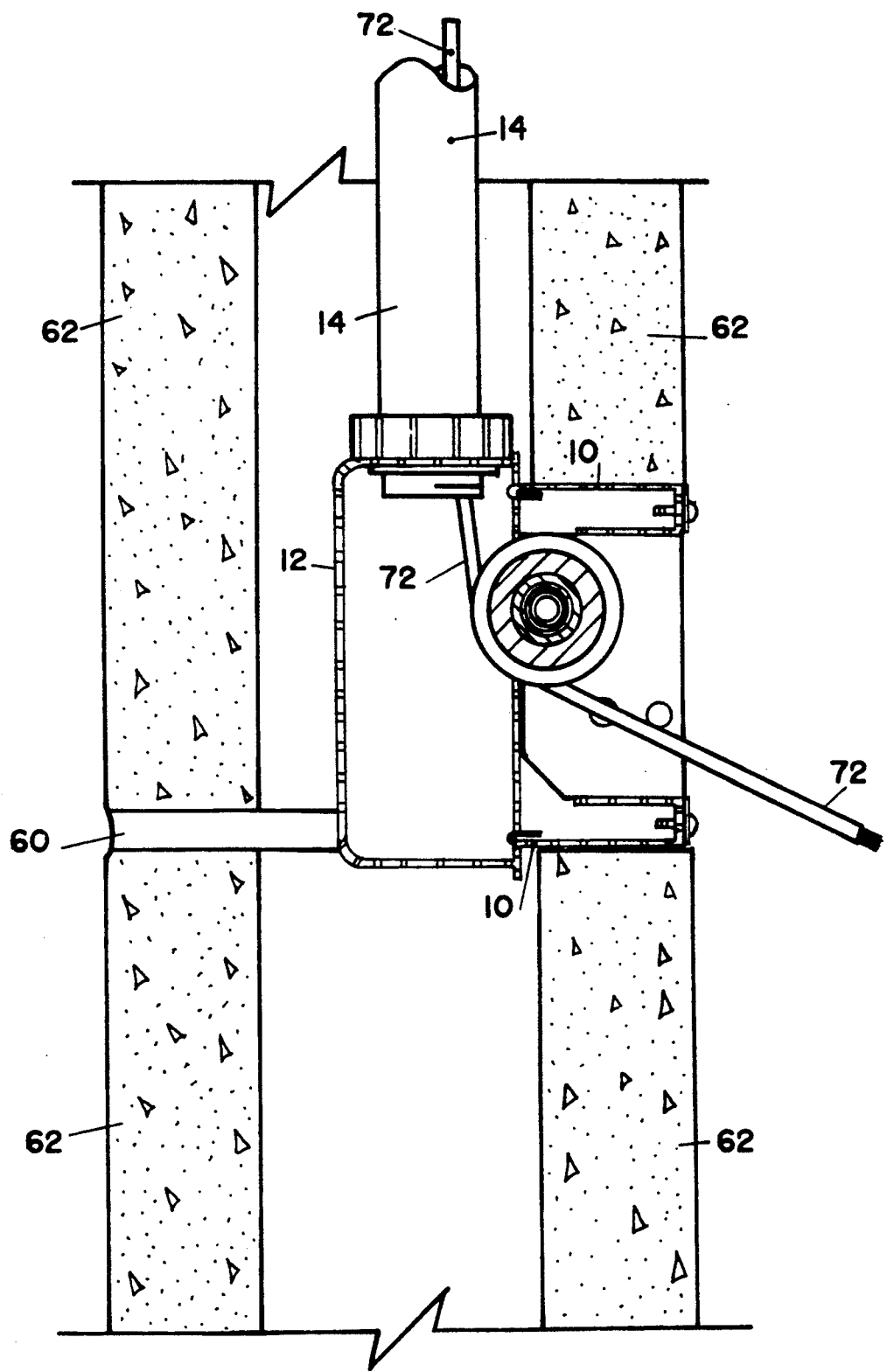
FIG. 7 is a side view of the present art mounted in a tile wall cover that is mounted to a junction box which has been placed in a masonry wall.

Referring now to FIG. 7, this is an elevation drawing showing the present art installed in a tile wall cover 10 which is attached to the junction box 12 that is attached to the conduit 14 that is constructed in a masonry wall comprised of masonry units 62 connected with mortar joints 60. FIG. 7 further shows the present art in use with optic fiber 72 being pulled through the conduit 14, junction box 12, and tile wall cover 10.

Figure 8:
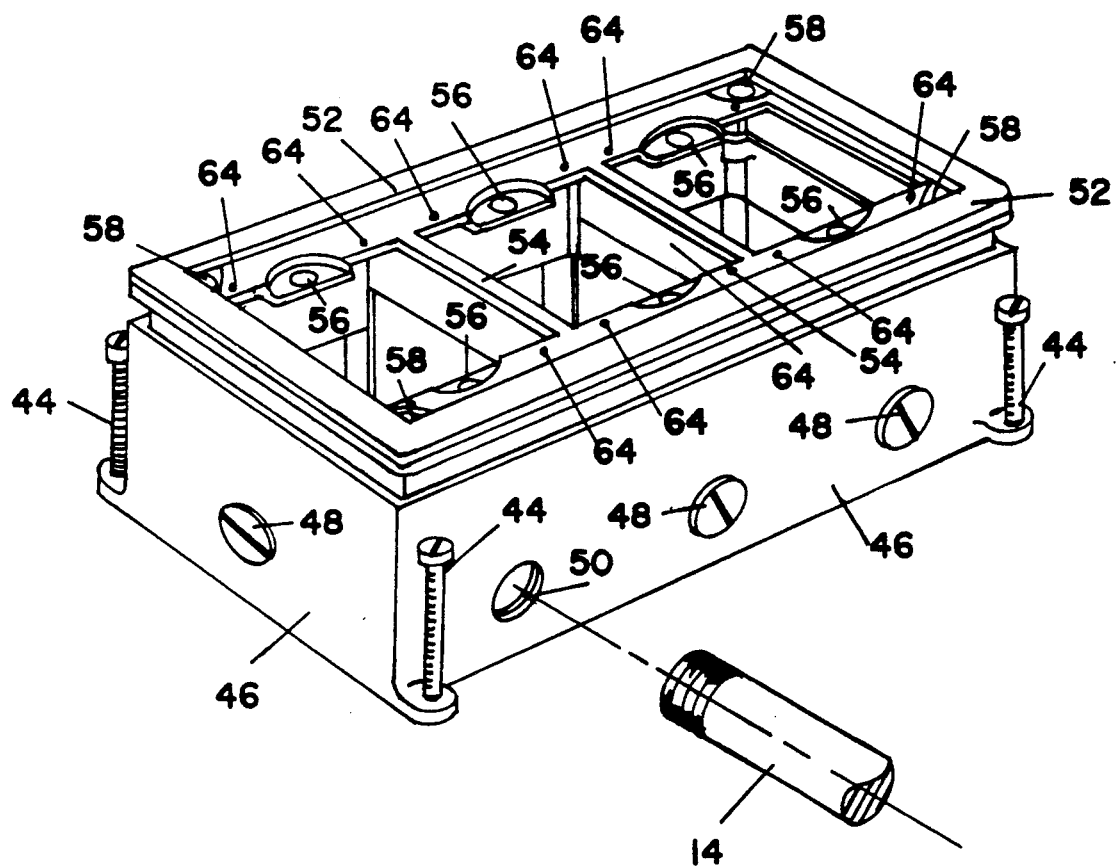
FIG. 8 is an isometric view of a triple gang box designed to be mounted in a floor.

Referring now to FIG. 8, it has details of outer embodiment 46 with screws 44 for anchoring. Also, shown in outer embodiment 46 is threaded holes 50 for receiving plugs 48 or conduit 14. Outer embodiment 46 has inner embodiment 52 which can be raised by screws 58 to desired elevation at finished floor. Inner embodiment 52 has removable partitions 54 and holes 56 properly spaced to receive various receptacles or the present art. The inner embodiment 52 is also equipped with holes 64 properly spaced to receive plates designed to meet the need of various receptacles as covers.

What is claimed is:

1. A wire and fiber guide for an electrical box in a building, comprising:
   a. an electrical box having one or more wiring conduits affixed thereto;
   b. a rectangular frame, including a plurality of retainer hole pairs located in opposite sides of the frame, said frame further including mounting tabs for securing said frame to said electrical box;
   c. a guide pulley freely rotatable about an axle, said axle supported by one pair of said retainer holes in opposite sides of said frame; said pulley further including a core sleeve and a pair of axles extending from the sides of said pulley, said axles being slidable located within said core sleeve and resiliently biased away from the center of the pulley with said plurality of retainer hole pairs in opposite sides of said frame being provided for holding said axles in alternate positions, thereby altering the position of said pulley.

2. The wire guide of claim 1 wherein said frame is dimensioned to fit closely within a standard electrical outlet box and said mounting tabs are positioned to receive attachment means in alignment with standard mounting holes in said outlet box.

* * * * *